Aug. 24, 1948.                    A. E. GOODWIN ET AL                    2,447,645
                              LOCKING-BAR MOTOR FRAME ASSEMBLY
                                     Filed Aug. 15, 1946

WITNESSES:
Edward M. Michaels
Nw. C. Groome

INVENTORS
Arthur E. Goodwin &
Leon R. Ludwig.
BY
O. B. Buchanan
ATTORNEY

Patented Aug. 24, 1948

2,447,645

UNITED STATES PATENT OFFICE 2,447,645

LOCKING-BAR MOTOR-FRAME ASSEMBLY

Arthur E. Goodwin, Eggertsville, N. Y., and Leon R. Ludwig, Pittsburgh, Pa., assignors to Westinghouse Electric Corporation, East Pittsburgh, Pa., a corporation of Pennsylvania Application August 15, 1946, Serial No. 690,629

2 Claims. (Cl. 172—36)

Our invention relates to electric motors, and it has more particular relation to redesigned line of induction motors, which have been restudied, from all angles, including cost-reduction, for the purpose of ascertaining what departures are possible, from standard or conventional practices, resulting in a saving or advantage of any kind, either a cost-saving, a size-reduction, or the like.

The principal object of our invention is to provide a stator-core assembly which locks together, with locking bars, fitting in different-sized notches in the stator-laminations and in the end-plates which retain the stator-laminations under compression, so that the whole fits together, like a Chinese puzzle, thus providing a construction which is much more convenient and less expensive, and in many respects more desirable, than riveting, welding, and other forms of connection.

Heretofore, one of the known ways of assembling stator punchings, was to insert them axially into stacking-rods or bars, or into the inside of stator frame-ring. However, such constructions have necessitated having such a loose fit, between the outer peripheries of the punchings and the members on which the punchings were stacked, that a good thermal junction was not made. This loose fit was necessitated by the fact that the punchings had to be loose enough to be movable axially, in the process of stacking. Other designs have been known, in which the stator punchings were completely assembled together, and permanently held in their assembled or compressed condition, before being pressed into a stator frame-ring, and this design has at times utilized a sufficiently tight fit, between the outer periphery of the stator punchings or laminations, and the inside of the stator frame-ring, so as to effect a ready heat-exchange between the stator laminations and the frame-ring.

Our present invention relates to the second type of punchings, and particularly to a novel locking-bar method of assembly thereof.

With the foregoing and other objects in view, our invention consists in the structures, combinations, systems, methods and parts, hereinafter described and claimed, and illustrated in the accompanying drawing, wherein:

Figure 1:
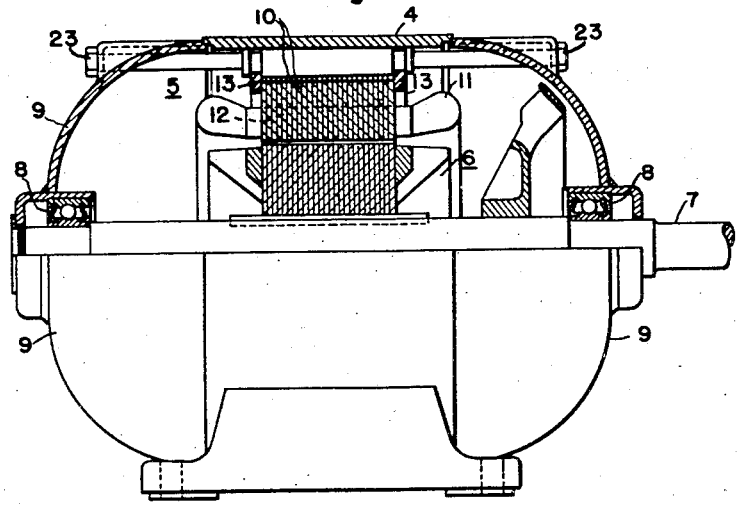
Figure 1 is a longitudinal sectional view of a squirrel-cage induction-motor embodying our invention by way of example.
Figure 2:
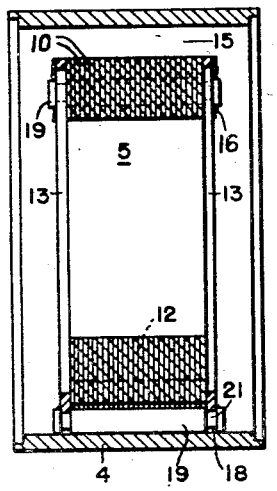
Fig. 2 is a longitudinal sectional view of the stator frame and core parts, without the stator-winding, the section-plane being indicated by the broken line II—II in Fig. 3.

In Fig. 1, our invention is shown as being applied to a motor having a stator frame-ring 4, a stator-core assembly 5, and a rotor-assembly 6, the latter including a shaft 7 which is mounted in bearings 8 carried by two end-brackets 9.

The stator-core assembly 5 consists of a core-proper, which is made up of a stack of stator-laminations 10 which carry stator windings 11, disposed in slots 12. Two end-plates 13 are provided, one at each end of the stack of stator-laminations 10.

In the particular stator-core assembly which is shown in our drawing, the stator-laminations 10 are of approximately somewhat square shape, with the corners rounded off, so as to make a tight fit, at 14, with the inside of the frame-ring 4, requiring the punchings to be forceably pressed into the frame ring, in the final assembly, so as to make a good thermal connection at these points, the remainder of the outer periphery of the punchings being spaced from the inside of the frame-ring 4, so as to provide axially extending ventilating-spaces 15. The outer peripheries of the end-plates 13 are similarly shaped, except that the outer diameter of the circular corners of the end-plates is not quite as large as the corresponding outer diameter of the punchings, so as not to interfere with the good thermal fit of the punchings, within the frame-ring 4. In the final assembly, the end-plates 13 may be welded in place, within the frame-ring 4, as indicated at 16 in Fig. 3.

Figure 3:
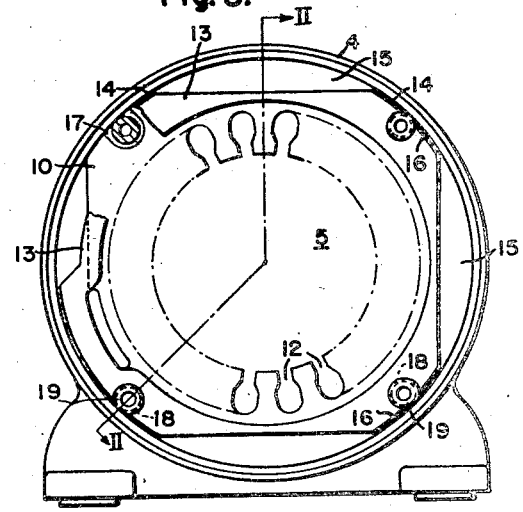
Fig. 3 is an end view of the stator shown in Fig. 2 with parts broken away, in successive stages, illustrating the construction.
Figure 4:
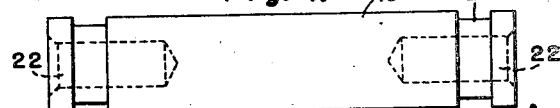
Fig. 4 is a plan view of a locking-bar.

At the four corners of the punchings 10, slots 17 are provided, which open peripherally, as shown in Fig. 3. The end-plates 13 are similarly provided with slots 18, except that the slots 18 of the end-plates are somewhat narrower and smaller than the slots 17 of the punchings or laminations.

In the assembly of the stator-core 10, with its two end-plates 13, before the stator-winding 11 is added, and before the core-assembly is pressed into the frame-ring 4, the core and end-plates are assembled together under pressure, and while they are still held under the adequate pressure, four locking-bars 19 are dropped into the slots 17 and 18, at the four corners of the assembly. These locking bars 19 are round rods, having a diameter which just fits within the slots 17 which are provided in the corners of the punchings or laminations 10. Each locking-bar 19 is provided, near each of its ends, with a groove 21, or reduced-diameter portion, which fits within the smaller slots 18 which are provided in the four corners of the end-plates. The parts thus fit together like a Chinese puzzle, so that, when the holding pressure is released from the stack of laminations and end-plates, the whole is held tightly together in assembled position.

The stator-core assembly is now in condition for the addition of the stator-windings 11, and when these have been added, the whole core-assembly can then be pressed into the stator frame-ring 4, and welded in position at 16, as shown in Fig. 3.

The ends of the locking-bars 19 may be pre-drilled at 22, to accommodate the bracket-bolts 23 which secure the brackets 9 to the frame.

Other features of our invention, which may be shown in the drawing, constitute the subject-matter of a contemporaneously filed application of Leon R. Ludwig, Theodore C. Fockler, William H. Formhals, and Howard T. Walton, Serial No. 690,628, filed August 15, 1946, relating to convertible-frame motors having interchangeable parts.

We claim as our invention:

1. A dynamo-electric machine characterized by a stator construction comprising a frame-ring, a stator-core comprising a rigidly held stack of stator-laminations fitting within the inside of the frame-ring, each lamination having a slot, opening into its outer periphery, at each of a plurality of frame-ring-fitting points, two end-plates for pressing the stator-laminations together, each end-plate having a slot, opening into its outer periphery, at points corresponding to the corresponding slots in the stator-laminations, the peripheral end-plate slots being narrower than the peripheral lamination slots, a plurality of locking-bars, each locking-bar having a cross-sectional size fitting in the peripheral lamination slots, and having two grooves fitting in the peripheral slots of the two end-plates, a stator-winding carried by the stator-core, and structural means for securing the stator-core assembly within the frame-ring.

2. A dynamo-electric machine characterized by a stator construction comprising a frame-ring, a stator-core comprising a rigidly held stack of stator-laminations fitting, at a plurality of spaced points about the outer periphery of the stator-laminations, within the inside of the frame-ring, the stator-laminations being spaced from the inside of the frame-ring at other peripheral points, each lamination having a slot, opening into its outer periphery, at each of a plurality of frame-ring-fitting points, two end-plates for pressing the stator-laminations together, each end-plate having a slot, opening into its outer periphery, at points corresponding to the corresponding slots in the stator-laminations, the peripheral end-plate slots being narrower than the peripheral lamination slots, a plurality of locking-bars, each locking-bar having a cross-sectional size fitting in the peripheral lamination slots, and having two grooves fitting in the peripheral slots of the two end-plates, a stator-winding carried by the stator-core, and structural means for securing the stator-core assembly within the frame-ring.

ARTHUR E. GOODWIN.
LEON R. LUDWIG.

REFERENCES CITED

The following references are of record in the file of this patent:

UNITED STATES PATENTS

| Number | Name | Date |
| --- | --- | --- |
| 1,939,032 | Aufiero | Dec. 12, 1933 |
| 2,253,191 | Morrill | Aug. 19, 1941 |